US011314160B2

(12) United States Patent
Chen

(10) Patent No.: US 11,314,160 B2
(45) Date of Patent: Apr. 26, 2022

(54) X-RAY FILM PACKAGING BAG PRINTER

(71) Applicant: Wenzhou Wapro Technology Co., Ltd., Wenzhou (CN)

(72) Inventor: Wenzhong Chen, Wenzhou (CN)

(73) Assignee: Wenzhou Wapro Technology Co., Ltd., Wenzhou (CN)

( * ) Notice: Subject to any disclaimer, the term of this patent is extended or adjusted under 35 U.S.C. 154(b) by 0 days.

(21) Appl. No.: 17/107,910

(22) Filed: Nov. 30, 2020

(65) Prior Publication Data

US 2021/0208494 A1    Jul. 8, 2021

(30) Foreign Application Priority Data

Jan. 7, 2020 (CN) .......................... 202020026435.4

(51) Int. Cl.
| | |
|---|---|
| *B41F 15/08* | (2006.01) |
| *G03C 3/00* | (2006.01) |
| *G03B 42/04* | (2021.01) |
| *G03B 15/08* | (2021.01) |
| *B41F 15/12* | (2006.01) |

(52) U.S. Cl.
CPC .......... *G03C 3/003* (2013.01); *B41F 15/0831* (2013.01); *B41F 15/12* (2013.01); *G03B 15/08* (2013.01); *G03B 42/042* (2013.01)

(58) Field of Classification Search
CPC .............. B41F 15/0831; B41F 15/0845; B41F 15/0859; B41F 15/085; B41F 15/0836
See application file for complete search history.

(56) References Cited

U.S. PATENT DOCUMENTS 3,973,489 A * 8/1976 Black .................. B41F 15/0831
101/115
2011/0293346 A1* 12/2011 Sato ..................... B41J 11/0085
400/578

FOREIGN PATENT DOCUMENTS

| EP | 0130751 A2 | * | 1/1985 | .......... B41F 33/0081 |
| GB | 2397277 A | * | 7/2004 | ............ B65H 35/04 |
| JP | 55133965 A | * | 10/1980 | ............ B41F 15/085 |
| JP | 60056552 A | * | 4/1985 | ............ B41F 15/085 |
| JP | 09131853 A | * | 5/1997 | |
| JP | 2009256811 A | * | 11/2009 | |

* cited by examiner

*Primary Examiner* — Leslie J Evanisko
(74) *Attorney, Agent, or Firm* — Ellen M. Bierman; Lowe Graham Jones LLC

(57) ABSTRACT

A X-ray film packaging bag printer is disclosed. A positioning detection device is arranged above a conveyor belt, positioning holes in an X-ray film packaging bag strip are detected by the positioning detection device, and positioning can be performed by only using adjacent two positioning holes. According to the X-ray film packaging bag printer, the accuracy of the positioning detection device can be improved, the parameter conflict with a set length of a machine can be avoided, that is, the problem of shutdown or hop printing caused by a detection error are effectively avoided; the printing stability and reliability of the X-ray film packaging bag printer are improved; the structure is simple; a printing process is integrated; the automation efficiency is high; the manual operation is reduced; the production efficiency is greatly improved; the production cost is low; the user experience is improved.

9 Claims, 2 Drawing Sheets

X-RAY FILM PACKAGING BAG PRINTER

CROSS-REFERENCE TO RELATED APPLICATION

This application claims the benefit of priority from China Patent Application No. 202020026435.4, filed Jan. 7, 2020, which application is incorporated herein by reference in its entirety.

TECHNICAL FIELD

The disclosure relates to the technical field of printers, and in particular, to an X-ray film packaging bag printer.

BACKGROUND

With continuous improvement of modern living standards, food consumed by people is richer and contains much sugar, and in addition, under the combined action of eating habits and the pace of life, dental diseases are popular increasingly. Before the treatment of the dental diseases, it is often necessary to X-ray the root of a tooth in order to determine an etiology and a lesion accurately.

The existing X-ray packaging bag printing devices have a variety of forms:

(1) parameter conflict with a set length of a machine;
(2) shutdown or hop printing caused by an electric eye identification error in a printing process.

In view of this, it is urgent to improve the structure of the existing X-ray film packaging bag printer to prevent the hop printing or shutdown and improve the printing efficiency.

BRIEF SUMMARY

The technical problems to be solved by the disclosure are that the structure of the existing X-ray film packaging bag printer is prone to the problem of hop printing or shutdown, and affects the printing efficiency.

In order to solve the technical problems, the technical solution adopted by the disclosure is to provide an X-ray film packaging bag printer, comprising a printer support frame, and further comprising:

a feeding device, fixedly arranged on a feeding support frame, located at the head end of the printer, comprising a conveyor belt and a motor, and used for conveying an X-ray film packaging bag, wherein a plurality of X-ray film packaging bags form a continuous X-ray film packaging bag strip, and positioning holes are uniformly formed in the X-ray film packaging bag strip at intervals;

a printing component, fixed to the printer support frame, arranged behind the feeding device along the conveyor belt, and used for printing characters on the X-ray film packaging bag;

a winding device, fixedly arranged on a winding support frame, located at the tail end of the printer, and used for winding a printed X-ray film packaging bag;

a positioning detection device, fixedly arranged on a detection device support frame, located between the feeding device and the printing component, and used for matching the positioning holes to detect the position of the X-ray film packaging bag, wherein the detection device support frame is fixed to one side of the conveyor belt, and the positioning detection device is arranged right above the conveyor belt.

In the above-mentioned technical solution, the X-ray film packaging bag printer may further comprise:

a drying device, arranged between the printing component and the winding device, and used for drying the characters on the printed X-ray film packaging bag;

a console device, fixedly arranged on the printer support frame, located on one side of the conveyor belt, and used for controlling the operation of the feeding device, the printing component, the winding device and the positioning detection device.

In the above-mentioned technical solution, the printing component may further comprise:

a scraper, fixed to a scraper frame, and matched with a screen frame for printing the characters on the X-ray film packaging bag;

a lifting table device, fixed to one side of the conveyor belt, wherein the scraper frame is fixed to the lifting table device.

In the above-mentioned technical solution, the drying device may comprise:

a drying oven device, which spans the conveyor belt and is buckled on the printer support frame;

a heating device, arranged above the drying oven device and tightly attached to the drying oven device;

a heating circulating device, connected to the heating device, and used for controlling the heating device to heat circularly.

In the above-mentioned technical solution, the screen frame may be arranged right above the conveyor belt; the two ends of the screen frame are fixed to the printer support frame through screen frame arms.

In the above-mentioned technical solution, the conveyor belt may be made of stainless steel; a table adhesive is arranged on the conveyor belt; positioning blocks used for limiting the position of the conveyor belt are arranged on the two sides of the conveyor belt; the positioning blocks are fixed to the printer support frame.

In the above-mentioned technical solution, a material tidying table device may be arranged between the positioning detection device and the feeding device, and is used for limiting the position of the X-ray film packaging bag strip.

In the above-mentioned technical solution, a roller may be arranged at the head end of the conveyor belt, and is used for extruding the X-ray film packaging bag strip to bond to the table adhesive; anti-sticking cloth is arranged at a contact position between the roller and the X-ray film packaging bag.

In the above-mentioned technical solution, the feeding device may further comprise a feeding disc; the feeding disc rotates to unwind on the feeding support frame.

In the above-mentioned technical solution, the winding device may comprise at least two winding discs which are arranged side by side; the two winding discs are used alternately.

Figure 1:
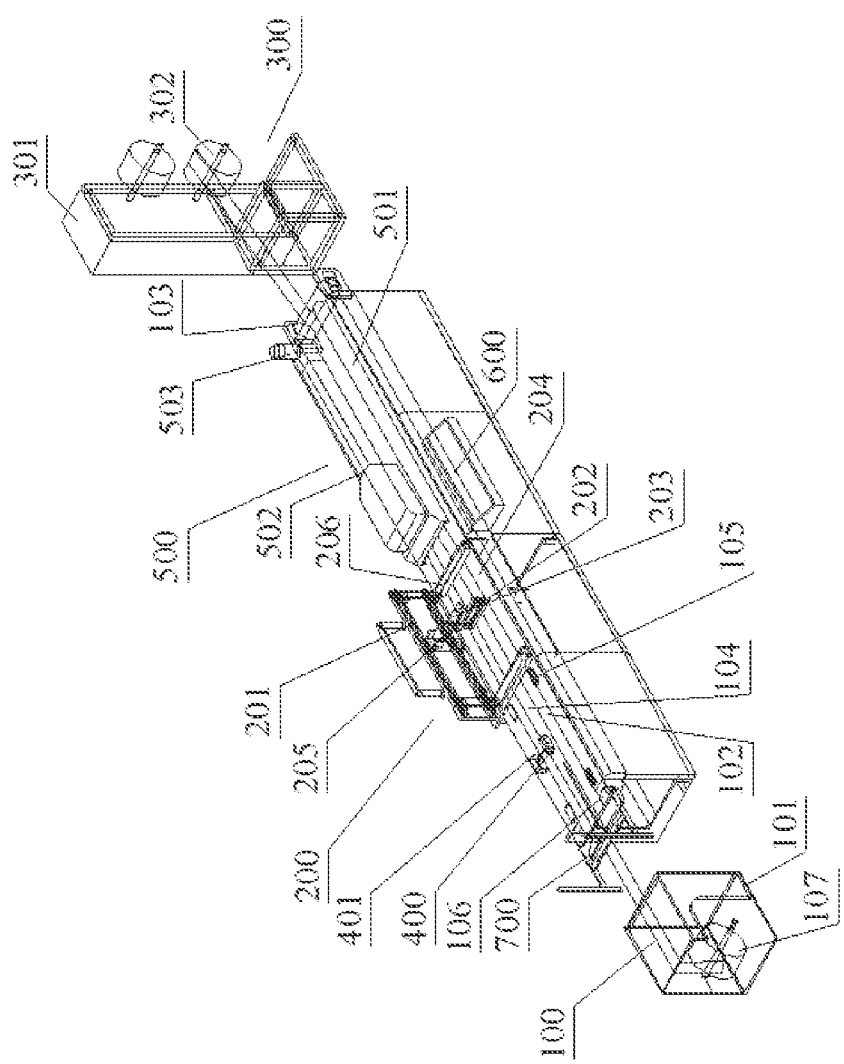
FIG. 1 is a perspective view of an X-ray film packaging bag printer of the disclosure.
Figure 2:
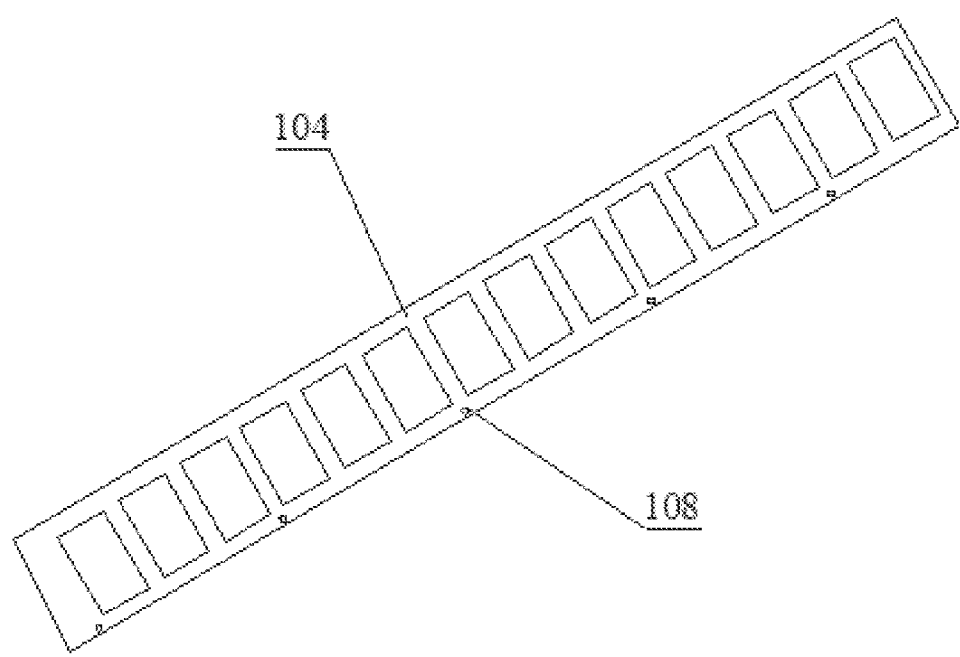
FIG. 2 is a perspective view of an X-ray film packaging bag printer strip of the disclosure.

The correspondence between reference signs and part names in FIG. 1 to FIG. 2 is as follows:

100 feeding device, 101 feeding support frame, 102 conveyor belt, 103 motor, 104 X-ray film packaging bag strip, 200 printing component, 201 printer support frame, 300 winding device, 301 winding support frame, 400 positioning detection device, 401 detection device support frame, 500 drying device, 600 console device, 202 scraper, 203 scraper frame, 204 screen frame, 205 lifting table device, 501 drying oven device, 502 heating device, 503 heating circulating device, 206 screen frame arm, 105 positioning block, 700 material tidying table device, 106 roller, 107 feeding disc, 302 winding disc, and 108 positioning hole.

DETAILED DESCRIPTION

The disclosure provides an X-ray film packaging bag printer, which can prevent hop printing or shutdown, and improve the printing efficiency. Compared with existing systems, the positioning detection device is arranged above the conveyor belt, the positioning holes in the X-ray film packaging bag strip are detected by the positioning detection device, and positioning can be performed by only using adjacent two positioning holes, so the accuracy of the positioning detection device can be improved; the parameter conflict with a set length of a machine can be avoided, that is, the problem of shutdown or hop printing caused by a detection error are effectively avoided; the printing stability and reliability of the X-ray film packaging bag printer are improved; the structure is simple; a printing process is integrated; the automation efficiency is high; manual operation is reduced; the production efficiency is greatly improved; the production cost is low; the user experience is improved.

The disclosure will now be described in detail with reference to the accompanying drawings and specific implementation modes of the description.

As shown in FIG. 1, the X-ray film packaging bag printer provided by the disclosure comprises a printer support frame 201, and further comprises:

a feeding device 100, fixedly arranged on a feeding support frame 101, located at the head end of the printer, comprising a conveyor belt 102 and a motor 103, and used for conveying an X-ray film packaging bag, wherein a plurality of X-ray film packaging bags form a continuous X-ray film packaging bag strip 104, and positioning holes 108 are uniformly formed in the X-ray film packaging bag strip 104 at intervals;

a printing component 200, fixed to the printer support frame 201, arranged behind the feeding device 100 along the conveyor belt 102, and used for printing characters on the X-ray film packaging bag;

a winding device 300, fixedly arranged on a winding support frame 301, located at the tail end of the printer, and used for winding a printed X-ray film packaging bag;

a positioning detection device 400, fixedly arranged on a detection device support frame 401, located between the feeding device 100 and the printing component 200, and used for matching the positioning holes 108 to detect the position of the X-ray film packaging bag, wherein the detection device support frame 401 is fixed to one side of the conveyor belt 102, and the positioning detection device 400 is arranged right above the conveyor belt 102.

In the embodiment shown, the positioning detection device 400 is arranged above the conveyor belt 102, the positioning holes 108 in the X-ray film packaging bag strip 104 are detected by the positioning detection device 400, and positioning can be performed by only using adjacent two positioning holes 108, so the accuracy of the positioning detection device 400 can be improved; the parameter conflict with a set length of a machine can be avoided, that is, the problem of shutdown or hop printing caused by a detection error are effectively avoided; the printing stability and reliability of the X-ray film packaging bag printer are improved; the structure is simple; a printing process is integrated; the automation efficiency is high; manual operation is reduced; the production efficiency is greatly improved; the production cost is low; the user experience is improved.

Specifically, the X-ray film packaging bag strip 104 is conveyed from the conveyor belt 102 to the printing component 200 on the feeding device 100; the positioning holes 108 are detected by the positioning detection device 400; after it is detected that the X-ray film packaging bag strip 104 passes through the positioning holes 108 next time, one-time printing is completed by the printing component 200, and the printed X-ray film packaging bag is wound by the winding device 300.

An electronic eye is arranged on the positioning detection device 400; the positioning holes 108 in the X-ray film packaging bag strip 104 are detected by the electronic eye; when there are three packaging bags arranged between adjacent two positioning holes 108, the printing of the three packaging bags can be completed by one-time printing of the printing component 200; the positioning holes 108 may be round or strip-shaped.

In one embodiment of the disclosure, the X-ray film packaging bag printer further comprises:

a drying device 500, arranged between the printing component 200 and the winding device 300, and used for drying the characters on the printed X-ray film packaging bag;

a console device 600, fixedly arranged on the printer support frame 201, located on one side of the conveyor belt 102, and used for controlling the operation of the feeding device 100, the printing component 200, the winding device 300 and the positioning detection device 400.

In the embodiment, the drying device 500 is arranged, which can dry the characters on the printed X-ray film packaging bag, and avoid scratching the paint printed on the X-ray film packaging bag; the console device 600 controls the operation of the feeding device 100, the printing component 200, the winding device 300 and the positioning detection device 400, which is beneficial to coordinating with the overall X-ray film packaging bag printer to work, so the work efficiency of the X-ray film packaging bag printer is improved.

In one embodiment of the disclosure, the printing component 200 comprises:

a scraper 202, fixed to a scraper frame 203, and matched with a screen frame 204 to print the characters on the X-ray film packaging bag;

a lifting table device 205, fixed to one side of the conveyor belt 102, wherein the scraper frame 203 is fixed to the lifting table device 205.

In this embodiment, the scraper 202 is fixedly arranged on the lifting table device 205; the scraper 202 may be driven by a lifting table to match the screen frame 204 to perform character printing on the X-ray film packaging bag; the lifting table device 205 may perform hole positioning through a control device; the lifting table device 205 controls the scraper 202 to be tightly attached to the screen frame 204 downwards, and move forwards along the conveying direction of the conveyor belt 102; the scraper 202 is uplifted to return to the original position backwards back to the conveying direction of the conveyor belt 102, so one-time printing of the X-ray film packaging bag is completed.

Baffles may be arranged around the printing device 200 to avoid the spilling of printing paint.

In one embodiment of the disclosure, the drying device 500 comprises:

a drying oven device 501, which spans the conveyor belt 102 and is buckled on the printer support frame 201;

a heating device 502, arranged above the drying oven device 501, and tightly attached to the drying oven device 501;

a heating circulating device 503, connected to the heating device 502, and used for controlling the heating device 502 to heat cyclically.

In this embodiment, the heating device 502 is arranged above the drying oven device 501, so the heating device 502 can dry the printed characters on the X-ray film packaging bag in the drying oven device 501, which can improve the solidifying and drying rate of the paint on the X-ray film packaging bag, and avoid scratching of the paint on the X-ray film packaging bag; the heating circulating device 503 controls the temperature and the heating time length of the heating device 502, which can effectively avoid the problem of damage to the X-ray film packaging bag caused by over-high temperature, meanwhile, can ensure the temperature in the drying oven device 501, control the heating time length, save the energy source, reduce the cost and improve the user experience.

In one embodiment of the disclosure, the screen frame 204 is arranged right above the conveyor belt 102; the two ends of the screen frame are fixed to the printer support frame 201 through screen frame arms 206.

In this embodiment, the screen frame 204 is arranged above the conveyor belt 102, which is beneficial for the printing component 200 to complete printing quickly; the screen frame 204 is fixed to the printer support frame 201 by the screen frame arms 206, which is beneficial to improving the stability and reliability of the printing component 200.

In one embodiment of the disclosure, the conveyor belt 102 is made of stainless steel; a table adhesive is arranged on the conveyor belt; positioning blocks 105 used for limiting the position of the conveyor belt are arranged on the two sides of the conveyor belt; the positioning blocks 105 are fixed to the printer support frame 201.

In this embodiment, the X-ray film packaging bag strip is bonded to the stainless steel conveyor belt 102 through the table adhesive; the overall X-ray film packaging bag is fixed to the conveyor belt 102, does not displace easily in a conveying process, and does not stick to ink during printing.

In one embodiment of the disclosure, a material tidying table device 700 is arranged between the positioning detection device and the feeding device 100, and is used for limiting the position of the X-ray film packaging bag strip 104.

In this embodiment, the position of the X-ray film packaging bag strip 104 is limited by the material tidying table device 700, and when the disc-shaped X-ray film packaging bag strip is in rotating operation or after a material tray is replaced, the same position is kept all the time; an upper roller and a lower roller are arranged on the material tidying table device 700, which can make the operating speed of a material uniform and the tension balanced through interpenetrating up and down.

In one embodiment of the disclosure, a roller 106 is arranged at the head end of the conveyor belt 102; anti-sticking cloth is arranged at a contact position between the roller 106 and the X-ray film packaging bag.

In this embodiment, the anti-sticking cloth is arranged in the middle of the roller, which can prevent the X-ray film packaging bag strip from sticking to the roller 106; the roller can make the X-ray film packaging bag strip bond to the table adhesive on the conveyor belt 102, and because the roller is rolling and has certain weight, the X-ray film packaging bag strip can be effectively located after being conveyed onto the conveyor belt 102, and then the accuracy of the position may be ensured when the positioning detection device 400 performs positioning detection.

In one embodiment of the disclosure, the feeding device 100 further comprises a feeding disc 107, and the feeding disc 107 rotates to unwind on the feeding support frame 101.

In this embodiment, the X-ray film packaging bag strip 104 is wound and is arranged on the feeding disc 107, which can save space occupancy and improve the space utilization rate; in addition, at the beginning of printing, the starting end of the X-ray film packaging bag is bonded to the table adhesive of the conveyor belt 102 manually, so long-time manual operation is not needed; the production efficiency is greatly improved; the production cost is low; the user experience is improved.

In one embodiment of the disclosure, the winding device 300 comprises at least two winding discs 302 which are arranged side by side; the two winding discs 302 are used alternately.

In this embodiment, the two winding discs 302 are arranged and are used alternately, so after the winding of one feeding disc 107 is completed, the other winding disc 302 is used for replacing immediately, thereby improving the production efficiency.

A motor 103 is arranged in the winding device; the feeding device 100 is matched with the winding device 300 to complete tension-free winding, which is beneficial to avoiding the damage to the X-ray film packaging bag and ensuring the product quality.

According to the X-ray film packaging bag printer disclosed by the disclosure, the positioning detection device is arranged above the conveyor belt, the positioning holes in the X-ray film packaging bag strip are detected by the positioning detection device, and positioning can be performed only using adjacent two positioning holes, so the accuracy of the positioning detection device can be improved; the parameter conflict with a set length of the machine can be avoided, that is, the problem of shutdown or hop printing caused by a detection error are effectively avoided; the printing stability and reliability of the X-ray film packaging bag printer are improved; the structure is simple; a printing process is integrated; the automation efficiency is high; manual operation is reduced; the production efficiency is greatly improved; the production cost is low; the user experience is improved.

In this disclosure, the terms "first", "second", and "third" are used for descriptive purposes only and may not be understood as indicating or implying relative importance; the term "multiple" refers to two or more, unless otherwise explicitly defined. The terms "mounted", "connected", "coupled", and "fixed" are all to be interpreted broadly, for example, the "connected" may be fixedly connected, or detachably connected, or integrally connected; the "coupled" may be directly coupled or indirectly coupled through an intermediate medium. Those of ordinary skill in the art, the specific meanings of the above terms in the disclosure may be understood in specific situations.

This disclosure is not limited to the above-mentioned implementation modes, anyone should know the structural changes made under the inspiration of the disclosure, and all technical solutions identical or similar to the disclosure fall within the protection scope of the disclosure.

The invention claimed is:

1. An X-ray film packaging bag printer, comprising a printer support frame, further comprising:

a feeding device, fixedly arranged on a feeding support frame, located at the head end of the printer, comprising a conveyor belt and a motor, and used for conveying an X-ray film packaging bag, wherein a plurality of X-ray film packaging bags form a continuous X-ray film packaging bag strip, and positioning holes are uniformly formed in the X-ray film packaging bag strip at intervals;

a printing component, fixed to the printer support frame, arranged behind the feeding device along the conveyor belt, and used for printing characters on the X-ray film packaging bag;

a winding device, fixedly arranged on a winding support frame, located at the tail end of the printer, and used for winding a printed X-ray film packaging bag;

a positioning detection device, fixedly arranged on a detection device support frame, located between the feeding device and the printing component, and used for matching the positioning holes to detect the position of the X-ray film packaging bag, wherein the detection device support frame is fixed to one side of the conveyor belt, and the positioning detection device is arranged right above the conveyor belt; and a drying device, arranged between the printing component and the winding device, and used for drying the characters on the printed X-ray film packaging bag, wherein the drying device comprises:

a drying oven device, which spans the conveyor belt and is buckled on the printer support frame;

a heating device, arranged above the drying oven device and tightly attached to the drying oven device; and a heating circulating device, connected to the heating device, and used for controlling the heating device to heat circularly.

2. The X-ray film packaging bag printer according to claim 1, further comprising:

a console device, fixedly arranged on the printer support frame, located on one side of the conveyor belt, and used for controlling the operation of the feeding device, the printing component, the winding device and the positioning detection device.

3. The X-ray film packaging bag printer according to claim 1, wherein the printing component comprises:

a scraper, fixed to a scraper frame, and matched with a screen frame for printing the characters on the X-ray film packaging bag; and a lifting table device, fixed to one side of the conveyor belt, wherein the scraper frame is fixed to the lifting table device.

4. The X-ray film packaging bag printer according to claim 3, wherein the screen frame is arranged right above the conveyor belt; the two ends of the screen frame are fixed to the printer support frame through screen frame arms.

5. The X-ray film packaging bag printer according to claim 1, wherein the conveyor belt is made of stainless steel; a table adhesive is arranged on the conveyor belt; positioning blocks used for limiting the position of the conveyor belt are arranged on the two sides of the conveyor belt; the positioning blocks are fixed to the printer support frame.

6. The X-ray film packaging bag printer according to claim 5, wherein a roller is arranged at the head end of the conveyor belt, and is used for extruding the X-ray film packaging bag strip to bond to the table adhesive; anti-sticking cloth is arranged at a contact position between the roller and the X-ray film packaging bag.

7. The X-ray film packaging bag printer according to claim 1, wherein a material tidying table device is arranged between the positioning detection device and the feeding device, and is used for limiting the position of the X-ray film packaging bag strip.

8. The X-ray film packaging bag printer according to claim 1, wherein the feeding device further comprises a feeding disc; the feeding disc rotates to unwind on the feeding support frame.

9. The X-ray film packaging bag printer according to claim 1, wherein the winding device comprises at least two winding discs which are arranged side by side; the two winding discs are used alternately.

\* \* \* \* \*